(12) United States Patent
Kirshenbaum et al.

(10) Patent No.: US 7,353,184 B2
(45) Date of Patent: Apr. 1, 2008

(54) CUSTOMER-SIDE MARKET SEGMENTATION

(75) Inventors: Evan R. Kirshenbaum, Mountain View, CA (US); Henri Jacques Suermondt, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1144 days.

(21) Appl. No.: 10/091,424

(22) Filed: Mar. 7, 2002

(65) Prior Publication Data
US 2003/0171975 A1    Sep. 11, 2003

(51) Int. Cl.
G06F 17/30    (2006.01)
G06F 15/16    (2006.01)
G06F 15/167   (2006.01)
G06G 1/00     (2006.01)

(52) U.S. Cl. .................. 705/10; 709/203; 709/218; 709/219; 709/222; 707/10

(58) Field of Classification Search .............. 705/52, 705/53, 77, 78, 79, 26, 27, 65, 66, 67, 13, 705/10; 707/10; 709/203, 218, 219, 222
See application file for complete search history.

(56) References Cited

U.S. PATENT DOCUMENTS 6,185,683 B1 *  2/2001  Ginter et al. .............. 713/176
6,343,274 B1 *  1/2002  McCollom et al. ........... 705/26
6,901,373 B1 *  5/2005  Chasko ....................... 705/14
2002/0147766 A1 * 10/2002 Vanska et al. ............. 709/203
2003/0130904 A1 *  7/2003  Katz et al. ................... 705/26
2004/0117261 A1 *  6/2004  Walker et al. ............... 705/14

OTHER PUBLICATIONS

Bogardus, Charlotte, The right tools can help operators identify and track customers for the millennium v33n3 pp. 32, 55, 1999.*

* cited by examiner

Primary Examiner—Andrew J. Fischer
Assistant Examiner—Charlie C. L. Agwumezie

(57) ABSTRACT

A system and method for customer-side market segmentation and categorization. This segmentation is done without disclosing sensitive private customer information to the business. A customer downloads a categorization module to a portable device (PDA, wireless cellular phone, etc.) or personal computer. A business defines a decision procedure corresponding to a set of defined customer categories. The business sends their rule set to the customer's device, which uses the rules and a set of stored customer-specific historical and demographic information to determine into which of the business-specific customer categories the customer falls. The categorization module may use any of a variety of methods, such as decision trees, neural networks, Bayesian belief networks, k-nearest neighbor, genetic algorithms, or rule sets. The customer category is sent to the business without other personal data for the business to prepare appropriate promotional material or initiate specific actions.

34 Claims, 4 Drawing Sheets

CUSTOMER-SIDE MARKET SEGMENTATION

TECHNICAL FIELD

The invention relates generally to electronic commerce with businesses and, more particularly to customer segmentation and customization of profiles or categorizations. This segmentation is done without disclosing sensitive private customer information to the business.

BACKGROUND

Businesses have a desire to be able to tailor advertising, promotions and offers to individual customers to increase the likelihood of engaging their interest and making a sale. Businesses are also interested in identifying people who are not likely customers so that they can avoid wasting time and money on them. Since it is typically impractical to gather enough data about a potential customer to make customization completely individual, the typical proxy is to partition the customer space into some discrete, usually small, number of market segments. The individual customer is then classified or categorized into a pre-defined market segment that seems to have a best fit.

As an example of such segmentation, a manufacturer might divide people into categories such as "price conscious" vs. "novelty seeking" vs. "brand loyal" vs. "status conscious" vs. "concerned with the environment" vs. "likes to think they are getting the best of you." The categorization is made for the purposes of selecting a particular direct mail (physical mail or e-mail) pitch to send to potential customers. A department store or web site, on the other hand, might be concerned with deciding to which department the customer should be steered.

Typically, information is obtained about a customer by looking at past behavior of that customer, either when interacting with this particular party, or from information purchased from third parties. The information might be valid, but there is always a question of how representative the information is and how much predictive power it has. There is an additional problem in that the identity of a customer is assumed, or at least a stable proxy for the customer. When customers are anonymous, there is no way to glean information about them. There is also a problem categorizing new customers, for whom no information yet exists.

An alternative way to obtain information is to have the customer fill out a questionnaire. This is time consuming and often seen as intrusive. It is also unlikely to reveal true answers, which may or may not be a problem, depending on the assumptions used in creating the rules.

The main conflict is that on one hand, customers are justifiably wary about giving out personal information and about businesses knowing too much about them. On the other hand, customers appreciate it when customization works and businesses correctly determine what a customer will find interesting and avoid showing the customer things that will not be found interesting.

It is desirable for users of e-commerce to maintain privacy of personal data while also receiving targeted offers of interest. Data mining past interaction behavior with e-commerce web sites is error-prone, intrusive and foiled when a user chooses to remain anonymous. Further, mining of past interaction may not necessarily be predictive of future interactions.

In some cases, customers are asked to classify themselves. This method lacks uniformity, even when the customer is provided explanation. There is no way to match these self-classifications to actual learned rules.

SUMMARY

It is an aspect of an embodiment of the present invention to allow customer segmentation and customization without disclosing sensitive private customer information to the business.

It is another aspect of the invention to provide customized shopping experiences for anonymous shoppers.

These and other aspects and embodiments are achieved in a system that is well suited for on-line or dynamic configuration of customer interactions.

According to an embodiment of the invention, a customer, first, must be willing to download the categorizer onto a PC (personal computer), PDA (portable digital assistant), or other device. Once the customer has control over the categorizer, his or her behavior, history and demographic information begins to be stored. An initial questionnaire may be shipped with the categorizer to fill in some initial blanks. The customer will have incentive to answer honestly without fear that the personal information will be released to third parties.

The customer then visits a participating business, either in person, or on-line. A decision procedure particular to the business is downloaded onto the customer's categorizer device. The categorizer runs the rule set and determines a category for the customer. This category may change over time due to changes in the customer's answers or history, or due to a change in the business' rule set. All of the calculations are executed on a device controlled by the customer. The only information communicated to the business is the resulting category code. A customer may choose to turn off the categorizer, possibly a plug-in to a web browser for e-business visits, or leave the portable device off or at home when visiting a business.

Once the business receives a category code, it has the option of acting or doing nothing. For some categories, doing nothing is appropriate, for instance, for the "leave me alone while I shop" category. In other cases, coupons, discounts, advertisements or other promotional literature could be printed, or displayed on a customer's device. In yet another case, notices may be sent to salespeople to alert them that a customer needs assistance. In another case, a notification may be sent to an affiliated service or business, which then sends promotional material to the customer in the form of a pop-up ad or email, or similar, for the case of e-businesses. Depending on what information a customer is willing to provide, i.e., e-mail address, postal address, etc., various embodiments will be able contact or notify the customer of prospective promotions.

DESCRIPTION OF THE DRAWINGS

The detailed description will refer to the following drawings, wherein like numerals refer to like elements, and wherein.

DETAILED DESCRIPTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
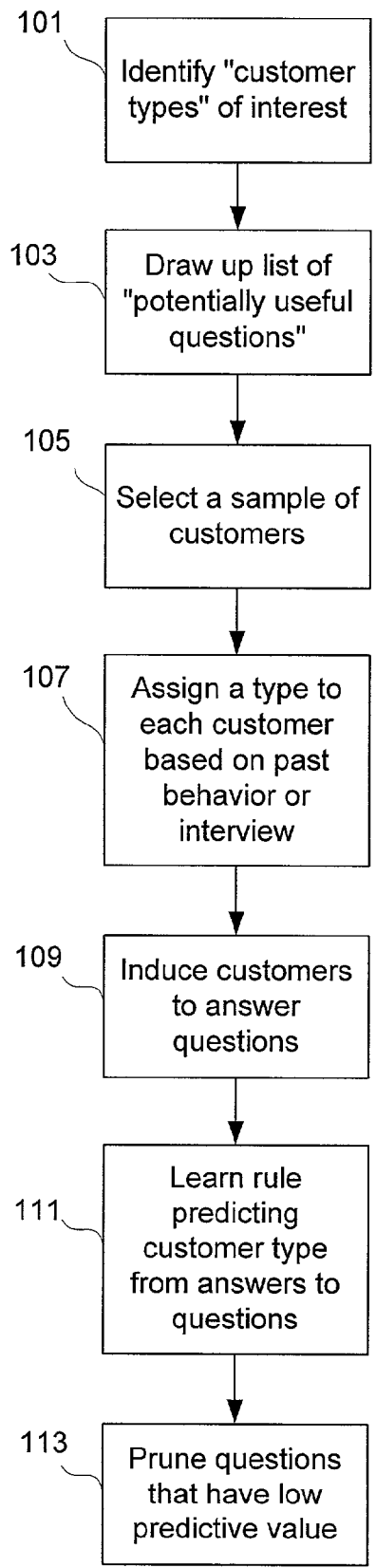
FIG. 1 is a flow diagram showing a method for obtaining rules to be used in a categorizer.

Referring now to the drawings, and in particular to FIG. 1, there is illustrated a flow diagram showing a method of the prior art for categorizing or segmenting a population in a given market area. First, customer types of interest are identified in block 101. A list of potentially useful questions is generated in block 103. A sample of customers is selected in block 105. Each customer is assigned a type based on past behavior or interview in block 107. Customers are induced to answering questions in block 109. Rules for predicting customer types are learned based on the answers to the questions and other information known or believed about the customer, in block 111. Finally, in block 113, questions that are deemed to be low in predictive value are pruned from the set asked to customers.

Figure 2:
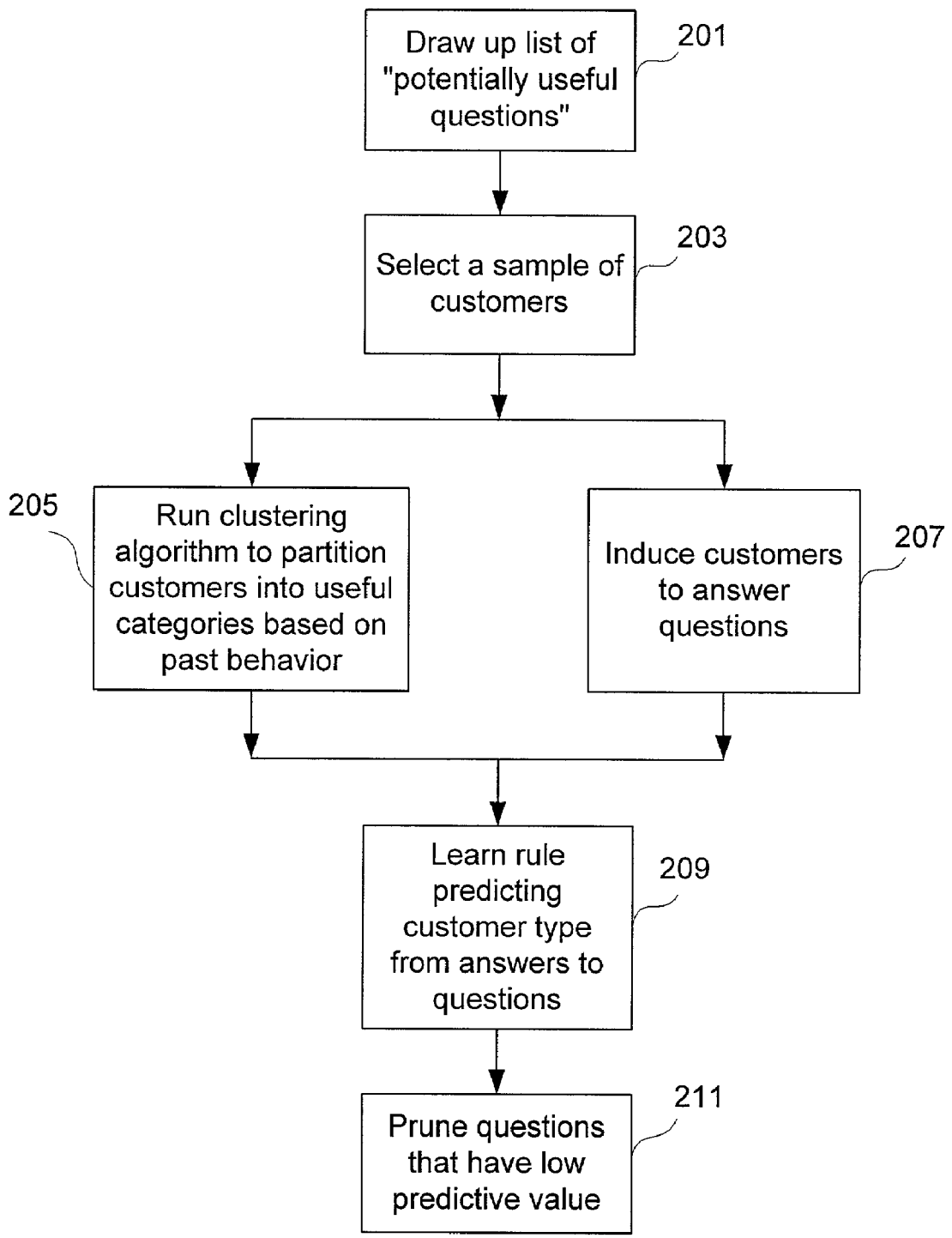
FIG. 2 is a flow diagram showing an alternative method for obtaining rules to be used in a categorizer.

Another method of the prior art is shown in FIG. 2. This method differs from that shown in FIG. 1 in that the customer types are not predetermined. A list of potentially useful questions is generated first, in block 201. A sample of customers is then selected in block 203. A clustering algorithm is run to partition customers into useful categories based on past behavior in block 205. With this method, customers are also induced to answer questions, in block 207. The order of these steps may be reversed, if desired. Rules for predicting customer types are learned from correlating answers to questions in block 209. Finally, in block 211, questions that are deemed to be low in predictive value are pruned from the set asked to customers.

Neither of these methods depend on the truthfulness of the customers answering questions. Instead, what is learned is a rule that takes as its input "customers who answer this question this way." The actual truth is irrelevant. However, an advantage of the present method is that a customer will be more amenable to answering the questions truthfully because private information is not revealed to the businesses.

In an exemplary embodiment of the present invention, a customer has a portable device for storing information about himself and answering queries from merchants. The device is capable of executing categorizer software that runs a decision procedure, provided by a merchant, which takes as input information about the customer provided to the device by the customer or observed by the device. Optionally, the device can dynamically interact with the customer to request information not in its database. The customer does not interact directly with the merchant, and the device communicates to the merchant only the resulting classification, keeping the specific information about the customer private. Thus, the customer's personal information is not revealed to the merchant. The decision procedure is downloaded onto the device through an interaction with a computer at the merchant's store. This communication will typically be wireless, but may involve making a physical connection.

The categorizer uses rules to determine a category for the customer. It will be apparent to one skilled in the art that the rules may be implemented using a neural network, a decision tree, complex Boolean expressions, a Bayesian network or other methods. These and other methods of implementing rules are discussed in Mitchell, T., *"Machine Learning"* (McGraw-Hill, 1997). In this text, Mitchell discusses the basics of the most popular techniques, including decision trees, neural networks, Bayesian belief networks, k-nearest neighbor, genetic algorithms, and rule sets. Any number of rule set implementations may be used as long as the business uses a corresponding method to define the rules. In an alternative embodiment, the customer's portable device utilizes more than one method, where each method corresponds with a different business, or set of businesses.

An example of a simple rule set for categorization includes three classes, "bargain hunter", "status seeker", and "gadget freak". For bargain hunters, a business would want to emphasize what a good deal the customer is getting. For status seeker, the business would want to emphasize how exclusive their product is. For gadget freaks, the business would want to emphasize all the bells and whistles their products have. A simple rule to be used only for illustrative purposes is:

if (income <$30,000/yr or number of children >2) then
class=BARGAIN HUNTER
else if (owns a dvd writer or owned a dvd player before 1999) then
class=GADGET FREAK
else if (subscribes to _Architectural Digest_) then
class=STATUS SEEKER
else
class=BARGAIN HUNTER.

The rule corresponds to a particular business' marketing or promotional model. In this exemplary embodiment, the business has decided that if a customer earns less than a threshold amount ($30,000 per year) or has more than two children, that they are likely to be bargain hunters. Further, if not enough information is known to meet the rule criteria, the customer will automatically be classified as a bargain hunter. While the business will not have personal information on individuals, it will have the categorization code for customers who use the device and that ultimately purchase goods or services from the business, or at least provide feedback. The business may reassess its marketing model at any time and redefine its rule sets.

In an exemplary embodiment, a customer's portable device will have some information which has been previously stored. This previously stored information is typically the result of a series of questions asked to the customer; the answers may be provided by using the customer's personal computer which downloads the history to the portable device, when requested. The portable device may also have data learned from previous interactions with the businesses using this method.

Figure 3:
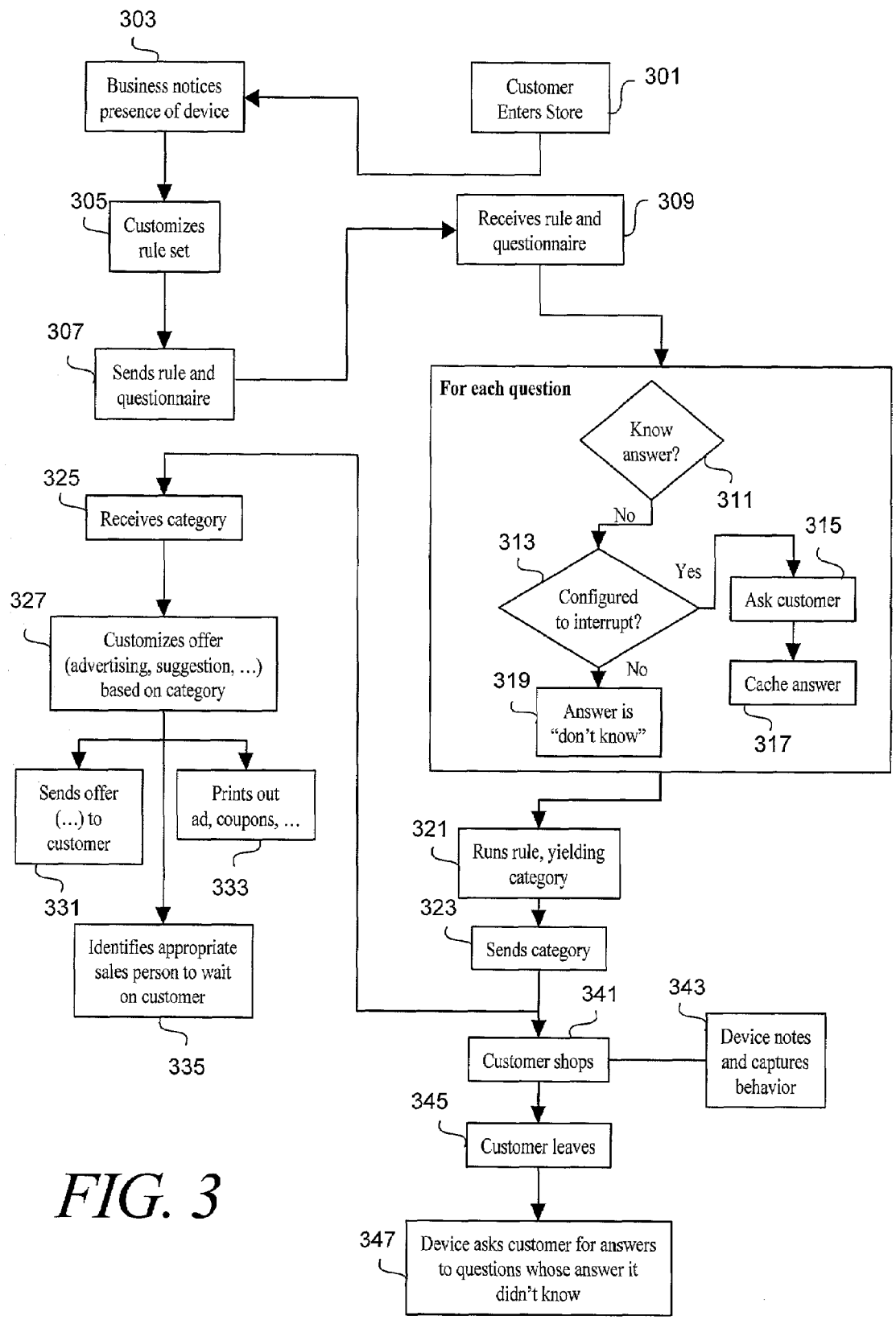
FIG. 3 is a flow diagram illustrating an embodiment of the present invention.

A typical scenario for using the portable device is shown in FIG. 3. Referring now to FIG. 3, first, a customer enters a store or business with the portable device in step 301. The version of categorization software in use on the device is identified. The business has a computer or promotional device which notices the presence of the customer's portable device, in step 303. The business customizes the rule set for the version of software running on the portable device in step 305. The business then sends appropriate rules to the customer's portable device. The portable device receives the rules in step 309. This interaction with the business is typically done wirelessly, but in alternative embodiments, a customer may be required to physically connect the portable device to the business' computer or promotional device. A cradle can be used to connect the portable device with the business' promotional device as is done to synchronize a personal digital assistant (PDA) with a personal computer (PC), e.g., a "hot synch cradle."

In alternative embodiments, several vendors may supply categorizing software for competing PDAs or other portable devices. An exemplary promotional device detects the version of categorizer and sends an appropriate set of rules. The promotional device may have multiple sets of rules implemented using various methodologies, e.g., decision tree, neural network, etc., that correspond to different portable devices.

For each question, the categorizer determines whether it knows the answer based on information already stored in the portable device in step 311. If not, it checks to see whether it is configured to interrupt the customer in step 313. If so, it queries the customer for the answer in step 315, and then caches the answer in step 317. If the portable device is configured so that it cannot, or may not, interrupt the customer, then the categorizer caches a "don't know" answer in step 319.

Once answers to all of the rule questions have been determined, the rules are run in the categorizer to yield a customer category-specific to the business in step 321. The category is sent to the business' promotional device in step 323. When the category code has been received by the business, in step 325, the business can then take appropriate action. In one embodiment, the business customizes offers or advertising based on the category code, in step 327. Once an offer has been customized, it is sent to the customer (step 331) or printed in the form of a coupon or advertisement (step 333). In an alternative embodiment, a particular sales person is selected and notified to wait on this particular customer in step 335.

The customer continues to shop without answering any additional questions. If the categorizer desires additional information to provide a higher quality categorization, it will ask the customer for the information at a later time. While the customer shops (step 341), the portable device notes and captures the customer's behavior in step 343. For instance, if the device is also used for purchasing, it may keep track of items purchased and money spent. If it has access to location information, it can track the customer's movement (either by latitude/longitude position or, via beacon information, between departments and displays in the store). If the portable device has, for instance, a barcode reader or camera, the customer can tell it about items of interest via scanning, and it may be able to notice objects the customer interacts with. If the portable device is connected to a biometric monitor, it may be able to record the customer's excitement level. If it has a microphone, it may be able to overhear, record, and interpret conversations the customer has with salespeople. It will be apparent to one skilled in the art that a variety of behavioral aspects of the customer may be captured and stored. Once the customer leaves the business in step 345, the portable device asks the customer for answers to questions whose answer it did not know, and which were requested by the rules, in step 347.

In alternative embodiment the business is an e-business on a global computer network such as an Internet and it may or may not have a brick and mortar facility. The customer will not physically enter the store or business, but virtually enters the business by viewing an appropriate home page or web page or logging into the e-business or service from, for instance, a home computer. Instead of running a categorizer in a portable device, in one embodiment, the categorizer is run on a device used to access the e-business by the customer. This is typically done with a personal computer (PC), but an alternative embodiments access to the e-business might be via wireless telephone or wireless PDA or by other means. In this embodiment the business detects the presence of the customer by virtue of the fact that the customer has electronically connected to the e-business, for instance by downloading the web pages from the business' site. In this alternative embodiment, when the customer accesses the e-business' web page, the e-business sends the decision procedure. In this case the e-business sends the decision procedure electronically to the customer and the categorizer on the customer's device is run using that decision procedure.

In another alternative embodiment, the customer may desire not to answer questions using the portable device. In this case the portable device will be synchronized with a less portable computing device, such as a home computer or PC. The set of questions required by the decision procedure will then appear on a display device on the customer's home computer. The customer will answer the questions using a standard keyboard or other typical input method. In this way the customer will not be required to answer the questions using the portable device because the ergodynamics of the portable device may not be amenable to answering a significant number of questions. It may be more comfortable or convenient for the customer to answer these questions using a home computer. The portable device is synchronized with the home computer and the decision procedure will run. In some embodiments, the categorizer runs on the portable device and in some other embodiments it runs on the home computer. If the decision procedure is run on the home computer a category will then be sent to the portable device for future communication with the business. In other embodiments the answers to the questions will be sent to the portable device and the portable device will run the decision procedure and result in a category to be sent in the future to the business. In this way, some questions can be answered by the customer directly on the portable device. If a significant number of questions are required, the customer may decide to answer some of them later on a home computer and synchronize it to the portable device.

Figure 4:
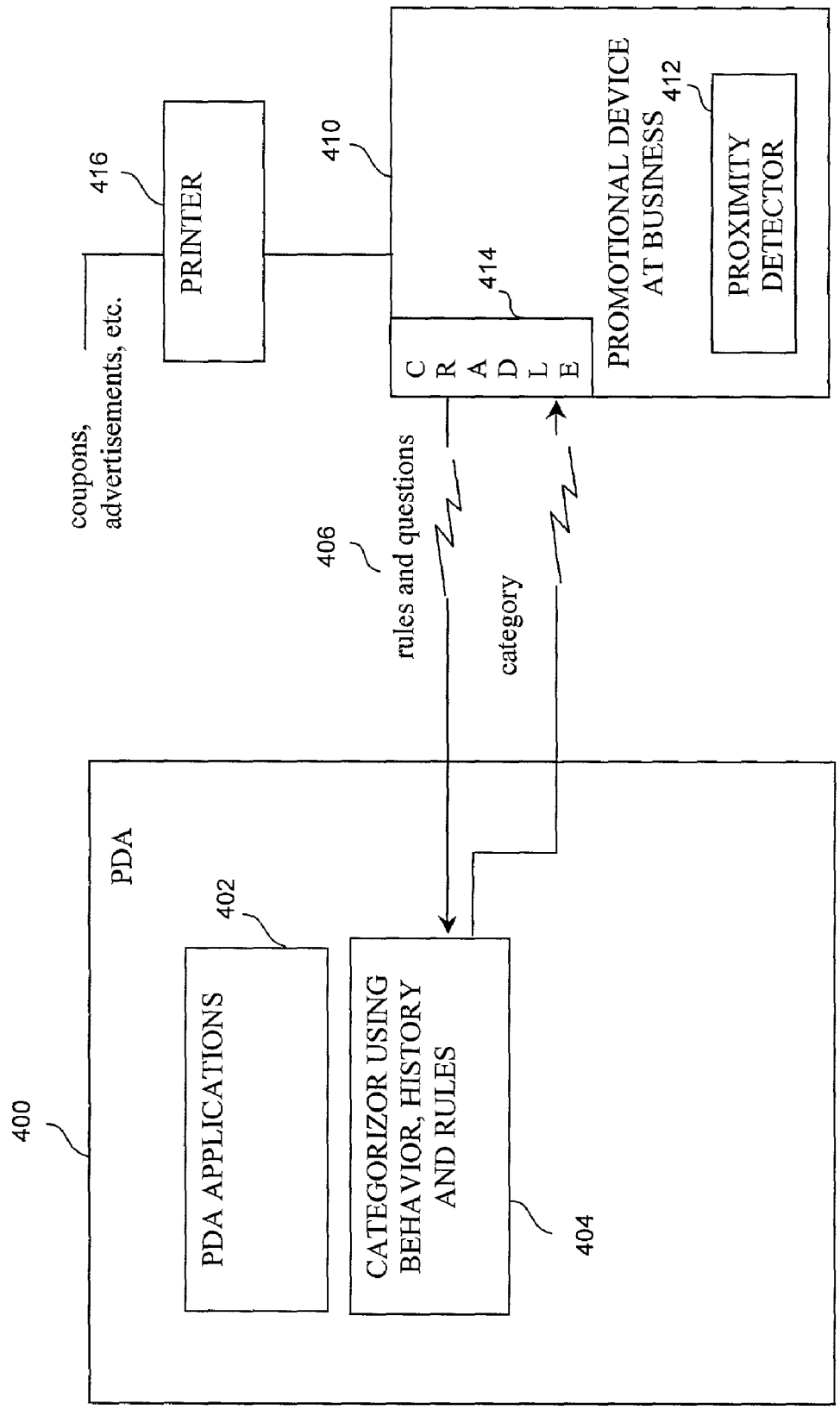
FIG. 4 is a block diagram of a customer's portable device and its interaction with a business' promotional device.

In an exemplary embodiment, the portable device contains an application for categorizing and communicates with a business' promotional device. Referring now to FIG. 4, there is shown a block diagram of the interaction between a customer's portable device and a business' promotional device. In this exemplary embodiment, the portable device is a customized PDA 400. The PDA 400 communicates with the promotional device 410 either wirelessly or via a connection like a cradle. The PDA runs a set of applications 402 as are used in the prior art, i.e., calendar, phone lists, calculator, etc. The PDA also has a categorizer application 404 loaded in memory. The categorizer holds the historical behavior of the customer and is designed to run a decision procedure, where the rules 406 are input from a promotional device 410.

The promotional device 410 detects the proximity of the PDA by means of a proximity detector 412 in a variety of ways. In one embodiment, the customer places the PDA in a cradle 414 connected to the promotional device. In another embodiment, the promotional device detects the presence of the PDA at the entranceway to the business establishment, for instance, in the same manner as inventory control devices detect shoplifted items. In an embodiment where the business is an e-business, the promotional device detects the customer by virtue of the customer logging on to the business' web site.

The promotional device is connected to a means for outputting promotional information. In this exemplary embodiment, the promotional device is connected to a printer 416. The printer 416 prints coupons, advertisements, or other appropriate promotional literature. For instance, if the category is bargain hunter, the promotional device might print a 25% off coupon for a specific item, or non-specific item. If the category is gadget freak, the promotional device might print out the technical specifications for a featured item. In an embodiment where the customer is connected to an e-business on the Internet, promotional literature may be sent via e-mail, or appear as a pop-up window, or appear as a hyperlink to a separate web page. If the category is status seeker, the promotional device might notify a sales person to provide assistance, if the business perceives customers of that category to require personal attention. In an alternative embodiment, the promotional device sends a wireless electronic message to the customer's PDA which displays information or a promotion while the customer is in the store.

In an alternative embodiment the customer may want to perform a sensitivity analysis to determine whether information is being revealed. This would take the form of playing "what if" game, such as, "what if I held one answer constant and varied the others?" If the answer doesn't change then a lot of information about that answer is being revealed. In the general case, one may try many different possible sets of answers and use the laws of probability to estimate the likelihood that a customer gave an actual answer, given the final result. Since the merchant can also perform this same calculation, one can see how much information one is giving away. For instance if a rule is run and the result is class 751 and a sensitivity analysis is then run, it may be determined that 95% of time class 751 identify as a female. The customer may feel that this is giving away too much information to a merchant; the merchant can assume that this customer is female based on the response. If a customer decides that this is sensitive information, an alternative embodiment is to be able to selectively decline to state a certain answer.

In another alternative embodiment there may be configurable safeguards to prevent the accidental leak of information. In addition to sending the decision procedure or rule set, merchants will likely identify themselves by passing an identity token or a digital certificate signed by a trusted party. The customer's device may be configurable to refuse to interact with, or only interact with, certain merchants or merchants with credentials from a particular agency. The identity of the merchant may also be used to restrict the questions that can be asked. Some merchants, but not others, may be allowed to ask of the customer's income level or sexual preference. This may be done on a per merchants/agency basis or the merchant or agency identity may be used to assign a trust level with a configuration based on this trust level.

This aspect may be combined with the embodiment using sensitivity analysis. The customer may be able to specify a sensitivity level for each question. For a given trust level the allowed uses can range from "do not answer" to "answer". Running through levels of "answer, but only if the result doesn't reveal the answer with more than X percent likelihood." It may also be useful for some trust levels to present to the customer "this is the answer I got, and here are the questions the rules asked, and the answers I gave", allowing the customer to confirm or withhold some of the information before sending. This aspect also allows a customer to correct information that has changed or that has been previously answered incorrectly, before sending the information to the business or merchant.

The rules themselves may represent significant investment or competitive advantage for a merchant. Thus, the merchant may want to take steps to prevent their decision procedures from being reverse engineered. In an alternative embodiment, a merchant will give the classes obscure names, for instance "class 21" rather than "push the DVD player." A merchant may also want to do other things to hide the details of the rules such as splitting their classes into several parts. Thus classes 41, 241 and 357 may all really be "likes to browse in peace." To prevent people from combining answers to reverse engineer the rules or decision procedure, a merchant may choose to alter the assignment of categories each time. Thus, what is class 21 for one customer will be reported as class 743 for another customer. If this is done, a notation of which mapping is being used needs to be sent to the merchant and returned to the customer, or simply remembered, if there is actual communication between the merchant and the device.

In an alternative embodiment, the decision procedure is run by a trusted third party and not on the customer's PDA or PC. This trusted third party may be selected by either the merchant or the customer, or approved by both. In this embodiment, the customer needs to identify himself in some way, which could be done by an active badge, a cell phone, swiping a card, a secure keypad with a changing password, or in some other method. It will be apparent to one skilled in the art that a variety of secure identification methods may be used. For instance in the case of on-line browsing the PC itself may automatically send an identification code. Once the merchant has acquired the identity, it can be handed along with the decision procedure to the trusted third party. The particular third party to use may be the choice of the customer, either given along with their identity or looked up based on their identity. Thus, the merchant in this case would have a mapping of identities and which third party to use. In other cases, the merchant may be the trusted third party. If the merchant's rules are stable over time, it will be possible for the merchant to simply pass its identity where the rules are already cached on the third party device. In other cases, the merchant passes its identity and an indication of the rule or decision procedure to use. There are several advantages to this alternative embodiment. First, if the merchant trusts the third party, it need not resort to obfuscation to try to prevent reverse engineering of its rules. Second, the third party is likely to have far more computing power than a PDA and so it can more easily perform a good sensitivity analysis. In addition, since the third party is likely to see the same rule many times for different customers, it can cache the results of the sensitivity analysis. A downside to this is that if the information requested is not in the third party's database, it will be more difficult to query the customer in off-line scenarios. Presumably, the trusted third party would fill in the database at a later time when the customer is online, perhaps by e-mailing to the customer a questionnaire or a pointer to a questionnaire, or for instance, a hyperlink, which would ask the answers and sensitivity level for the questions that it could not answer. The method used to send the identity of the customer to the third party need not give any information about the customer. The identity information may be uniquely generated for a particular session by taking an actual identity number, blinding it by concatenating it with a random number and encrypting it with the third party's public key. The third party can decrypt and throw away the random part to get the actual identity number, but the merchant has not gotten any information. It will be apparent to those skilled in the art that a variety of methods may be used to mask the actual identity of the customer from the third party.

In another embodiment, customers can chose to share their information based on the defined uses of that information by the merchant. For instance, in online commerce, or e-commerce, there is a standard called PPP (Platform for Privacy Protection) by which websites notify the users of what information they collect, what it is used for and how it is used. In this embodiment, the merchant defines what the categorization code is used for. The customer may then chose whether or not he is willing to answer a question needed by the decision procedure based on the intended use for the categorization code. For example, a customer may decide that he is willing to answer the questions if the categorization code is defined for deciding what to present to the customer during this particular shopping trip or for general purchasing decisions. However, the customer may not wish to answer questions if the categorization code is being used to decide whether to direct junk mail or advertisements to the customer. In order to be useful, this assertion for the use of the categorization code would be necessary to be signed by a trusted auditor who verified that indeed this is what the merchant does with the categorization. It will be apparent to one skilled in the art that there exist several different organizations now that are third parties who verify merchant privacy protection procedures or other aspects of the e-business where a customer desires an additional level of trust to ensure that the merchant is complying with its own set of rules and policies.

A business may determine that some of the inputs to its decision procedure depend on factors outside of the particular customer's information. Examples of this may be time of day, day of the week, proximity to Christmas or other high volume purchasing holidays, geographic location, affluence of the area around the store, stock market trading volume or the previous day's consumption of hot dogs. In such cases, the actual rule sent to the customer may reflect the known answers to those questions at the present time, either by treating them as constants and sending simplified rules, or by having different rules sent in different situations.

In other cases, rules may be partially filled in before being sent to the customer, based on information that the merchant knows to be true about this customer. This information may be based on past interactions (prior purchases, prior visits, information tied to known account numbers) or inferred using physical observation (e.g., sex, race or age from image analysis and weight measured from in-floor scales).

While some information about the customer is stable, or reasonably so over time, e.g., sex, race, birth date, martial status, favorite color, etc., other potentially useful information is a function of the customer's current "mode." The appropriate response to a particular customer may vary depending on whether they are on a quick trip to the store for something that is needed or researching future purchase or looking for a gift or just browsing in a store. Economists noticed long ago that a purchasers behavior depends on the beneficiary, i.e., who was to be the recipient of the purchased item. Other information that might be useful to a merchant is at what time/date a particular gift is needed to be in a particular place, or the particular pressure a customer is under and the reason for the purchase, i.e., whether it is a regular grocery shopping trip, shopping for dinner with a special guest, for a fraternity party or a candlelight dinner with a romantic interest. The customer's device might be delivered pre-configured with a number of such modes allowing the customer to easily select the ones that apply for the current shopping trip and possibly to construct new modes.

Having described preferred embodiments of a novel method and system for customer-side market segmentation, or categorization, (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

The invention claimed is:

1. A system for customer-side market segmentation while preventing disclosure of sensitive customer information, comprising:
   a non-merchant-controlled device that generates a category code based on a business-specific decision procedure and stores customer information, wherein the customer information is kept private from merchants based on specified criteria;
   a first merchant-controlled device that provides the business-specific decision procedure to the non-merchant-controlled device;
   a second merchant-controlled device that receives the category code from the non-merchant-controlled device; and
   a customer-controlled device that obtains the criteria used to keep information private.

2. The system as recited in claim 1, wherein the business-specific decision procedure is provided to the non-merchant-controlled device over a public, global communication network and the category code is also sent over the public, global communication network from the non-merchant-controlled device.

3. The system as recited in claim 1, wherein the first and second merchant-controlled devices are integrated as one physical unit as a promotional device.

4. The system as recited in claim 1, wherein the non-merchant-controlled device is integrated with the customer-controlled device.

5. The system as recited in claim 1, wherein the non-merchant-controlled device is a third-party-controlled device.

6. The system as recited in claim 5, wherein customer identification is masked to prevent identification of the customer by a merchant.

7. The system as recited in claim 5, wherein the first merchant-controlled device selects the third-party-controlled device from a plurality of third-party devices based on customer preferences.

8. The system as recited in claim 1, wherein the first merchant-controlled device provides identification information to the non-merchant-controlled device, and wherein the non-merchant-controlled device utilizes configurable safeguards combined with the provided identification information to prevent undesirable release of customer information.

9. The system as recited in claim 8, wherein the identification information uses an identity token.

10. The system as recited in claim 8, wherein the identification information uses a digital certificate.

11. The system as recited in claim 1, wherein the first merchant-controlled device further comprises a proximity detector for detecting the presence of a non-merchant-controlled device.

12. The system as recited in claim 1, wherein the non-merchant-controlled device queries the customer for additional information responsive to receipt of the business-specific decision procedure.

13. The system as recited in claim 12, wherein the non-merchant-controlled device comprises a portable device and a personal computer (PC), the PC permitting entering of additional information requested by the query, wherein the additional information entered into the PC is transferred to the portable device at the request of the customer, and wherein the portable device is used for interaction with the promotional device.

14. The system as recited in claim 1, wherein the non-merchant-controlled device also performs sensitivity analysis on the business-specific decision procedure, thereby determining whether sensitive information is to be revealed to a merchant based on the categorization.

15. The system as recited in claim 1, wherein the business-specific decision procedure masks rules and resulting categories to prevent reverse-engineering of the decision procedure.

16. The system as recited in claim 1, further comprising a device that provides promotional material to a customer.

17. The system as recited in claim 16, wherein the device that provides promotional material comprises a printing device.

18. The system as recited in claim 1, wherein the non-merchant-controlled device is a customer-controlled personal digital assistant (PDA).

19. The system as recited in claim 18, wherein the non-merchant-controlled device queries the customer for additional information responsive to receipt of a business-specific decision procedure, and wherein the PDA includes an interface for entering additional information requested by the query.

20. A method for customer-side market segmentation, said method comprising steps of:
 receiving a business-specific decision procedure by a non-merchant-controlled device;
 obtaining criteria used for keeping the customer information private;
 executing a categorizer on the non-merchant-controlled device, the categorizer using the received business-specific decision procedure and a set of stored customer-specific information, the executing resulting in an identified customer category code; and
 providing the identified customer category code,
 wherein the category code is generated by the categorizer.

21. The method of claim 20, further comprising: providing promotional material to the customer by a business, wherein the business provides the business-specific decision procedure received by the non-merchant-controlled device, and wherein the promotional material is customized based on the identified customer category.

22. The method of claim 21, wherein the promotional material is selected from a group consisting of discount coupons, advertisements, product information, business information;
 competitor comparisons, product comparisons, special offers and feedback requests.

23. The method of claim 21, wherein promotional information is printed at a business location and provided to a customer shopping at the business location.

24. The method as recited in claim 21, wherein the non-merchant-controlled device is a customer-controlled device.

25. The method of claim 24, wherein promotional information is displayed on the customer-controlled device.

26. The method of claim 20, farther comprising steps of:
 querying the customer for additional information by the non-merchant-controlled device, responsive to receiving a business-specific decision procedure;
 and inputting additional information by the customer, wherein the additional information is added to the stored customer-specific information for use by the categorizer.

27. The method of claim 20, farther comprising steps of:
 capturing additional information related to the customer, wherein the additional information comprises at least one item selected from the group consisting of customer behavior, outside factors, and customer mode;
 and expanding the stored customer-specific information with the additional information, wherein the additional information is used by the categorizer to provide an updated customer category.

28. The method as recited in claim 20, wherein the non-merchant-controlled device is a third-party controlled device.

29. The method of claim 28, further comprising: providing promotional material to the customer by a business, wherein the business provides the business-specific decision procedure received by the third-party-controlled device, and wherein the promotional material is customized based on the identified customer category.

30. The method as recited in claim 20, further comprising steps of:
 performing sensitivity analysis on the decision procedure to safeguard sensitive information, by the customer.

31. A computer readable medium containing computer executable instructions for categorizing a customer, said instructions comprising:
 a first code section that receives a business-specific rule set from a business;
 a second code section that inputs customer-specific information and stores said information in memory;
 a third code section categorizing that categorizes a customer, wherein the third code section uses the business-specific rule set received by the receiving first code section and customer-specific information stored in memory, said categorization resulting in a customer category code; and
 a fourth code section sending that sends the customer category code to the business, wherein the sending guards the customer-specific information stored in memory from being sent to the business~wherein the third code section generates the category_code.

32. A computer readable medium containing computer executable instructions for use in a promotional device utilizing customer categories, said instructions comprising:
 a first code section that detects a customer-controlled categorization device;
 a second code section that sends a business-specific rule set to the customer-controlled categorization device; and
 a third code section that receives a customer category from the customer-controlled categorization device, wherein the customer category was generated using the business-specific rule set and customer-specific information stored in memory in the customer-controlled categorization device; and
 a fourth code section that generates a category_code.

33. The computer readable medium as recited in claim 32, further comprising a fourth code section that determines a preferred action based on the customer category received.

34. A computer-readable medium storing computer-executable instructions for providing customer information, said instructions comprising:

obtaining and storing customer information; receiving business-specific decision procedures from different businesses;

receiving a particular business-specific decision procedure from a requesting business; and processing the customer information based on said particular business-specific decision procedure, subject to specified customer privacy criteria, in order to obtain processed customer information; and sending the processed customer information to the requesting business; and generating a customer category_code.

\* \* \* \* \*

UNITED STATES PATENT AND TRADEMARK OFFICE
CERTIFICATE OF CORRECTION

PATENT NO. : 7,353,184 B2 Page 1 of 1
APPLICATION NO. : 10/091424
DATED : April 1, 2008
INVENTOR(S) : Evan R. Kirshenbaum et al.

It is certified that error appears in the above-identified patent and that said Letters Patent is hereby corrected as shown below:

In column 12, line 3, in Claim 26, delete "farther" and insert -- further --, therefor.

In column 12, line 11, in Claim 27, delete "farther" and insert -- further --, therefor.

In column 12, line 50, in Claim 31, delete "business~wherein" and insert -- business, wherein --, therefor.

Signed and Sealed this

Nineteenth Day of May, 2009

JOHN DOLL
*Acting Director of the United States Patent and Trademark Office*